March 3, 1964

J. KNOX-SEITH 3,123,718

MAGNETIC CONTROL CIRCUITS

Filed Aug. 15, 1960

2 Sheets-Sheet 1

INVENTOR
J. KNOX-SEITH
BY William H. Kamstra
ATTORNEY

FLUX DISTRIBUTION
AFTER RESET

FLUX DISTRIBUTION AFTER
CLOCK PULSE ALONE

FLUX DISTRIBUTION
AFTER INPUT VARIABLE PULSE
AND CLOCK PULSE FOLLOWING
CLOCK PULSE ALONE

INVENTOR
J. KNOX-SEITH
BY
William H. Kamstra
ATTORNEY

United States Patent Office 3,123,718

Patented Mar. 3, 1964

3,123,718
MAGNETIC CONTROL CIRCUITS

John Knox-Seith, Palo Alto, Calif., assignor to Bell Telephone Laboratories, Incorporated, New York, N.Y., a corporation of New York Filed Aug. 15, 1960, Ser. No. 49,630
15 Claims. (Cl. 307—88)

Figures 1, 3:
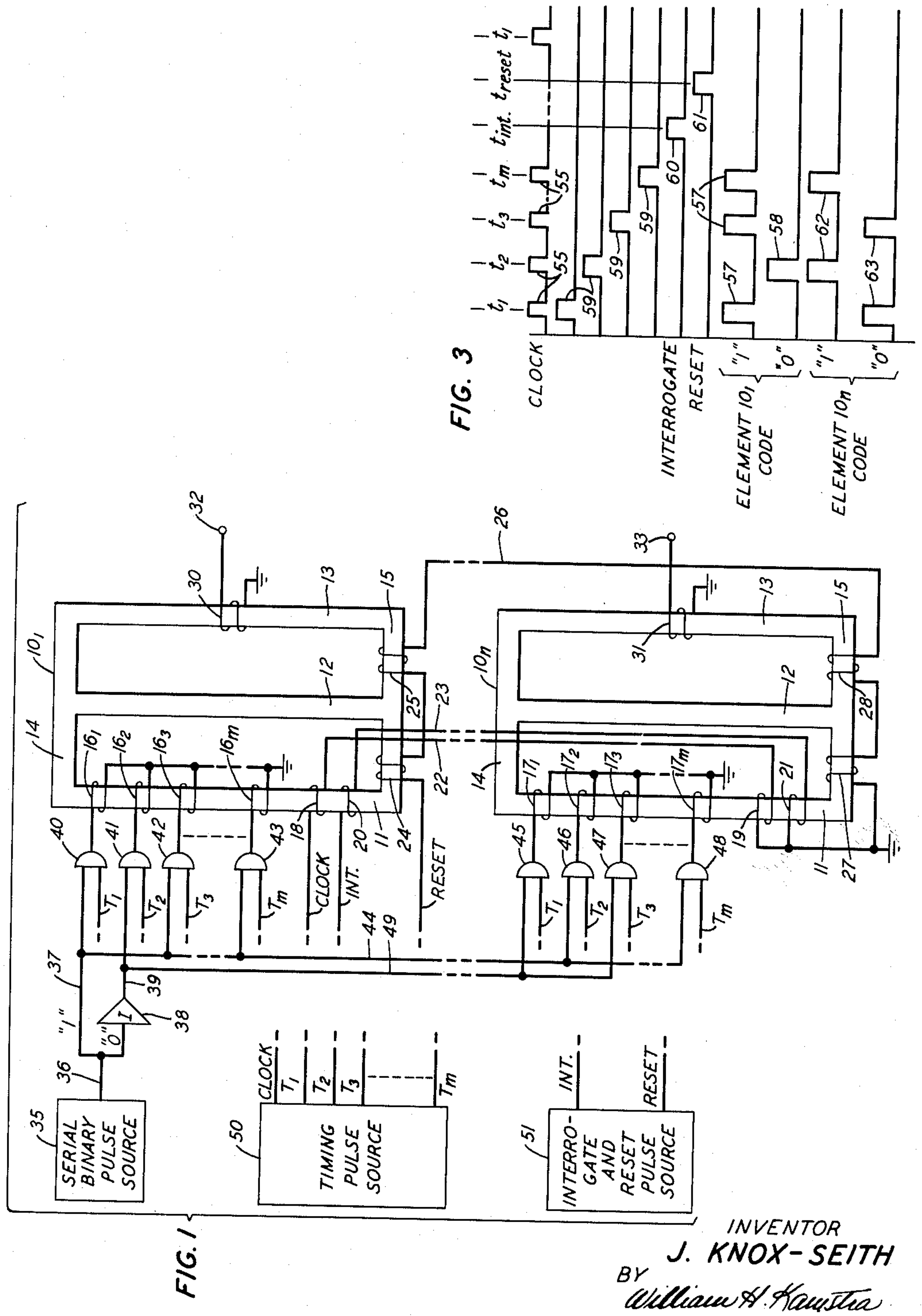

This invention relates to electrical coding circuits and particularly to such circuits adatped for use in electronic telephone switching systems for recognizing coded signal groups from among numbers of such signal groups.

In electrical information handling systems such as an electronc telephone system, for example, it frequently becomes necessary to provide a means for recognizing in the system the presence at predetermined points of particular coded information signal groups. Thus, in the electronic telephone switching system described in the copending application of D. B. James et al., Serial No. 760,502, filed September 11, 1958, now Patent 2,957,949 issued October 25, 1960, when a connection is to be established through a remote concentrator, a binary code identifying the subscriber to be connected is transmitted from the concentrator control to the remote concentrator. The binary code serves to effect the desired connection in the remote concentrator. The recognition of this code is thus an important function upon which the operation of the system depends.

It is an object of the present invention to provide a new and improved electrical code recognition circuit.

Another object of this invention is to provide a code recognition circuit in which individual characters of a code group may be serially introduced, their identity established, and a signal condition generated in accordance with the correctness of the code.

A further object of this invention is to provide a simple and more reliable code recognition circuit capable of operating at high speed and being relatively inexpensive to fabricate.

The foregoing and other objects of this invention are achieved in one illustrative embodiment thereof utilizing a multi-apertured magnetic element as a temporary information storage and switching means. The magnetic element is fabricated of a magnetic material having substantially rectangular hysteresis characteristics to have a first and a second aperture therein. An input, a bypass, and an output leg are thus formed to present one flux loop through the input and output legs and a second flux loop through the input and bypass legs. The dimensions of the magnetic element are determined such that the legs presenting the flux loops are each of substantially the same minimum cross-sectional areas. The dimensions thus insure that all of the possible flux loops in the element are flux-limited to the same flux magnitude.

The variables of the code group to be recognized by the specific circuit being described are introduced individually on separate input windings assigned to the variables, which input windings are inductively coupled to the input leg of the element. By means of a previous reset operation, a reset flux pattern is established in the magnetic element in a manner such that a remanent flux is induced in one direction through the input leg and is closed in the opposite direction through the outut leg. The bypass leg at this time is substantially unmagnetized. Current pulses representative of the input variables are applied sequentially to the respective input windings simultaneously with periodic clock current pulses applied to a clock winding also coupled to the input leg. The sense of the input and clock windings and the magnitude of the variable and clock input pulses are adjusted so that the magnetomotive forces generated thereby are opposing. The magnetomotive force generated by the variable input is also sufficiently large with respect to that of the clock pulse to counteract the latter force. As a result, when a clock pulse alone is applied, the flux in the input leg is switched. When, however, an input variable is applied simultaneously with the clock pulse, the variable pulse counteracts the effect of the clock puse to prevent flux switching in the input leg. The switching flux, as distinguished from a reset flux, induced in the input leg of the magnetic element during an input phase of operation of the circuit of this invention, will be closed through the shortest available path or paths in accordance with known magnetic principles. These paths at this time comprise both the bypass leg and the output leg whereas in a later operative condition such flux closure will be through the bypass leg alone.

According to the principles of this invention, each of the input variables of a code to be recognized is represented by the presence of an input signal. During the input phase, if any of the input variables of the particular code to be recognized is not present, the clock pulse occurring at the expected time of the absent variable will cause a flux switching in the input leg, which switchwill restore the output leg to a substantially unmagnetized condition. This follows since the bypass leg in its reset state is substantially unmagnetized and therefore provides only a partial closure path for the switching flux. The remainder of the switching flux closes through the output leg to drive that leg to a substantially unmagnetized condition. Any subsequent flux switching in the input leg as the result of subsequent variable and clock pulses or of clock pulses alone will now occur in the second flux loop, that is, in the loop defined by the input and bypass legs, with no further magnetic effect on the output leg. Since the switching flux induced in the input leg may now find full closure through the bypass leg, the output leg will not further be required for a closure path during the input phase. It is thus clear that during an input phase, on the first occasion that an input variable constituting one of the characters of the particular code to be recognized is missing, the magnetic element will be switched from its reset magnetic condition. Thus, if all of the input variables of the code to be recognized have been received, the magnetic element will not have been switched from its initial reset magnetic condition and the output leg will remain in its initial remanent state. On the other hand, if any one of the input variables has not corresponded to the correct code, the magnetic element will have been switched from the reset condition and no subsequent switching current pulse applied to the input leg alone can cause a further flux switching in the output leg.

After the termination of the input phase of operation an interrogate current pulse is applied to an interrogate winding also coupled to the input leg of the magnetic element. The sense of the interrogate winding and the polarity of the interrogate current pulse are also such as to switch the flux in the input leg from its reset condition. Manifestly, if such a flux switching has already occurred responsive to the absence of a variable from the code which the particular circuit is intended to recognize, no flux switching can occur in the input leg nor in the output leg during interrogation. Even had the flux in the input leg been restored to its reset polarity, the closure of the flux would be through the bypass leg and any flux switching thus resulting from the interrogate current pulse would be around the loop including the input and bypass legs. The output leg in either of these cases remains magnetically undisturbed by the interrogate pulse. This failure to cause a flux switching by the interrogate current pulse is indicated by the absence of a signal on an output winding coupled to the output leg of the magnetic element. The absence of such an output signal in turn is indicative of the fact that the particular code received during the input phase was not a code recognizable by the circuit.

On the other hand, had all of the proper variables of a code been received to block any flux switching in the input leg by the clock pulses, the interrogate current pulse will cause a flux switching in the input leg. In this case, the magnetic element would have remained in its reset magnetic condition and the interrogate current pulse would have the same effect as one of the clock pulses applied alone. That is, only a part of the interrogate switching flux can be closed through the bypass leg with the remainder driving the output leg to a substantially unmagnetized condition as previously explained in connection with the application of a clock pulse alone. An output signal is generated as a result in the output winding, which output signal is indicative of the fact that a particular code has been recognized. In a subsequent reset phase, the magnetic element is restored to its reset magnetic flux pattern preparatory to the reception of further serial input variables. A novel code recognition circuit is thus provided by means of which one code may be recognized from among a plurality of codes received.

The foregoing circuit is advantageously extended in accordance with the principles of this invention to make possible the recognition of a number of codes from among a plurality of codes. By multiplying the number of individual magnetic switching elements, the input variable windings may be arranged so that each of the elements is flux controlled to respond to a different code. The output winding of the magnetic element recognizing its particular code from among a plurality of codes received will then have generated therein an output signal indicative of the recognized code. A highly useful and simply fabricated code recognition circuit is thus achieved; one which is less susceptible to erroneous or spurious readings since once the circuit has determined that the code being received is not the one for which its windings are arranged, no possibility exists for producing an erroneous output signal indicating the reception of the correct code.

It is a feature of this invention that a plurality of input variable windings are coupled to an input leg of a multi-apertured magnetic element to which input leg a clock winding is also coupled. Current pulses of one magnitude and polarity representative of input variables are sequentially applied to the input windings coincidentally with periodic clock pulses of a lesser magnitude and opposite polarity to prevent flux switching in the magnetic element by the clock pulses.

According to another feature of this invention a magnetic element is provided in a code recognition circuit in which flux changes from a reset flux pattern or the absence of such changes during an input phase of operation are read during an interrogation phase. The changes or absence of such changes are determined by whether or not a correct input variable signal group recognizable by the recognition circuit was received. An output signal or the absence of an output signal on an output winding responsive to the interrogation signal then indicates the reception of the proper code signal group or a foreign code signal group, respectively.

It is still another feature of this invention that a plurality of magnetic switching elements are arranged to respond to assigned different code signal groups to recognize thereby individual code signal groups from among a number of received code signal group.

Figure 2A:
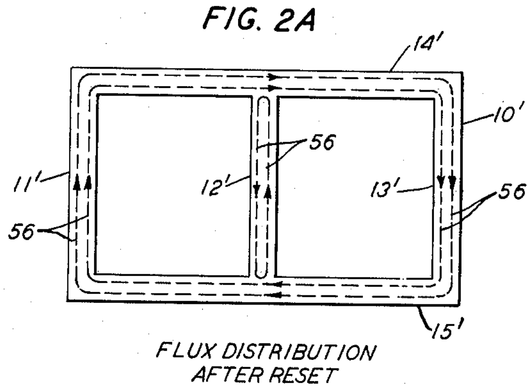
Figure 2B:
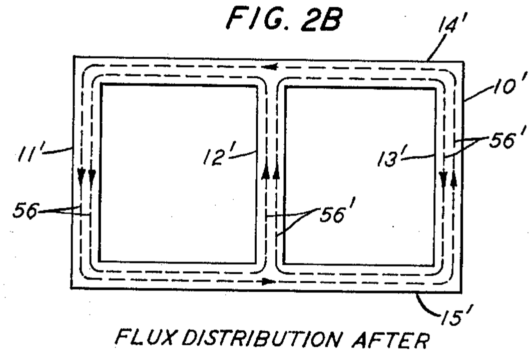
Figure 2C:
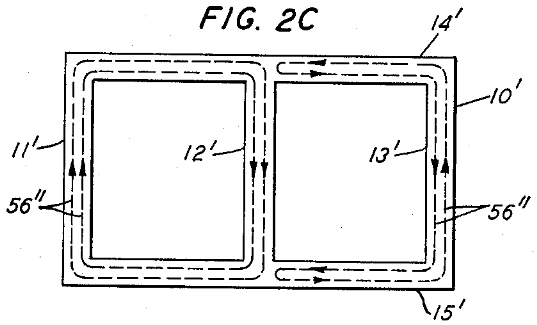

The foregoing and other objects and features of this invention will be better understood from a consideration of a detailed description of one illustrative embodiment of this invention which follows when taken in conjunction with the accompanying drawing in which:

FIG. 1 is a schematic diagram of a plural code recognition circuit according to the principles of this invention;

FIGS. 2A, 2B, and 2C depict a multi-apertured magnetic element employed in the practice of this invention having symbolized therein remanent flux distributions during various operative phases and to which reference may be had in describing an illustrative cycle of operation of this invention; and FIG. 3 is a pulse comparison chart showing in idealized form various current pulses and their time relationship during particular operative phases of this invention.

Turning now to the drawing, a detailed description of one specific illustrative embodiment of this invention depicted in FIG. 1 may be considered. The embodiment of FIG. 1 constitutes a multistage code recognition circuit, each stage of which is capable of recognizing a particular code signal group from among a number of such code signal groups received by the circuit. The first and the last stage of an implicit plurality of stages are explicity shown in FIG. 1, which first and last stage comprise, as the information storage and switching means, multi-apertured magnetic elements $10_1$ and $10_n$, respectively. The magnetic elements 10 are each fabricated of a magnetic material having substantially rectangular hysteresis characteristics to have a pair of apertures therein. The apertures in each element 10 form an input leg 11, a bypass leg 12, and an output leg 13. The legs of the elements 10 are connected at their ends by siderails 14 and 15 also formed by the apertures. The legs 11, 12, and 13 as well as the siderails 14 and 15 of each of the elements 10 are formed to have minimum cross-sectional areas of substantially equal dimensions. As a result, each of the elements 10 presents a structure in which all of the available flux paths are flux-limited to substantially the same flux magnitude. The elements 10 and the magnetic principles governing their operation are described in detail in the copending application of T. H. Crowley et al., Serial No. 732,549, filed May 2, 1958, now Patent 2,963,591 issued December 6, 1960.

The input legs 11 of the elements $10_1$ through $10_n$ each has a plurality of windings coupled thereto, which windings are energized during various phases of operation. Specifically, each of the input legs 11 has coupled thereto a number of input variable windings equal to the number of the particular code group which the stage of which the input leg is part, is to recognize. Thus, the input leg 11 of the element $10_1$ has coupled thereto the input variable windings $16_1$ through $16_m$ and the element $10_n$ has coupled thereto the input variable windings $17_1$ through $17_m$. The input legs 11 of the elements $10_1$ through $10_n$ also each has coupled thereto a clock and an interrogate winding. The first and the last elements $10_1$ and $10_n$ thus also have on their input legs 11, the clock windings 18 and 19, and the interrogate windings 20 and 21, respectively. The clock winding 18 of the element $10_1$ is connected in series with the clock winding 19 of the element $10_n$ via the clock windings of other elements 10, understood as being interposed, and a conductor 22. In a similar manner the interrogate winding 20 of the element $10_1$ is connected in series with the interrogate winding 21 of the element $10_n$ via the interrogate windings of the elements 10, also understood as being interposed, and a conductor 23. Reset windings 24 and 25 are coupled to the siderails 15 of the element $10_1$ through its apertures. The latter reset windings are connected in series with similar reset windings of the understood interposed elements 10 and a conductor 26 to reset windings 27 and 28 coupled to the siderails 15 of the element $10_n$ through its apertures. One end of each of the input variable windings of each of the stages as represented by the windings 16 and 17 is connected to ground as is the terminating end of the clock and interrogate windings 19 and 21, respectively, of the last element $10_n$. The terminating end of the reset winding 27 of the last element $10_n$ is also connected to ground. Each of the output legs 13 of the elements $10_1$ through $10_n$ has coupled thereto a single output winding, such as the output winding 30 and the output winding 31 coupled to the output legs 13 of the elements $10_1$ and $10_n$, respectively. The output windings 30 and 31 are connected at one end to ground and at the other ends to output terminals 32 and 33, respectively.

An input network originating at a source of serial binary pulses 35 is connected to the other ends of each of the input variable windings, such as the windings 16 and 17, of the stages of the circuit of FIG. 1. Coded signal groups, in this case, in binary form, are introduced into the recognition circuit of FIG. 1 via a conductor 36 connected to the output of the source 35. As will be described in further detail hereinafter, the binary coded signals appear on the conductor 36 in the form of the presence of a signal at a given time representing a binary "1" and the absence of such a signal at the given time representing a binary "0." In order to achieve signals of equal magnitude for the characters of each code to be recognized, the signals representative of binary "1's" are transmitted directly to the input connections of the input variable windings of the elements 10 via a paralleling conductor 37. The binary "0" representations are inverted by a parallel inverting circuit means 38 to provide corresponding input signals of the code groups for this binary value, the latter signals being transmitted to the input connections of the input variable windings via a conductor 39.

The input means so far described, including a source of binary coded signals, may advantageously comprise connections in the electronic telephone system described in the aforementioned copending application of D. B. James et al. Thus, for example, the serial binary pulse source 35 may advantageously comprise the Output Gate 702 shown in FIG. 7 of the D. B. James et al. application, which output gate also provides a binary coded signal group. The conductor 36 then corresponds to the conductor 501, and the inverter means 38 corresponds to the inverter 626, the conductor 501 and circuit 626 being shown in FIGS. 5 and 6, respectively, of the foregoing copending application. As direct connecting means of the present invention with the telephone system of the copending application of D. B. James et al. the conductors 37 and 39 may be connected to the conductors 401 and 403, respectively, of FIG. 5 of that application. A source 35 and inverting means 38 are thus readily devisable by one skilled in the art and accordingly need not be described with greater particularity herein.

The conductors 37 and 39 are interconnected with the input variable windings of the stages of the recognition circuit of FIG. 1 in accordance with the different codes the stages are to recognize. In order to provide the proper timing for the inputs to the stages and to translate the serial coded signals appearing on the pair of input conductors 37 and 39 to sequential signals on a plurality of input variable windings on each of the stages, the coded signal groups are applied under the control of periodic timing pulses to each of the proper input variable windings through a gating means. In this connection it will be assumed for purposes of description that the first stage of the multistage circuit of FIG. 1 is to recognize the binary code group 1, 0, 1, . . . 1 and the last stage of the circuit is to recognize the binary code group 0, 1, 0, . . . 1. Accordingly, for the first stage, the binary "1" conductor 37 is connected through the gates 40, 42, and 43 to the input variable windings $16_1$, $16_3$, and $16_m$, respectively, and the binary "0" conductor 39 is connected through the gate 41 to the input variable winding $16_2$. In accordance with the exemplary code group to be recognized by the last stage, the binary "1" conductor 37 is connected via a paralleling conductor 44 through the gates 46 and 48 to the input variable windings $17_2$ and $17_m$, respectively. The binary "0" conductor 39 is connected via a second paralleling conductor 49 through the gates 45 and 47 to the input variable windings $17_1$ and $17_3$, respectively. The gates 40 through 48 comprise AND gating circuits having a pair of inputs and one output. Circuits of this type are well known in the art and any suitable circuit for performing this function may be used for this purpose. The other input to each of the gates 40 through 48 is a timing pulse to insure the proper sequence of inputs to the input variable windings of the stages.

The various operating current pulses for the input phase of operation of the circuit of FIG. 1 are provided by a timing pulse source 50 having a plurality of outputs and which is capable of generating a plurality of sequential pulses on those outputs. Sequentially operating circuits for generating the pulses required by the recognition circuit being described are well known in the art and may comprise, for example, a magnetic core stepping switch. A "clock" output of the source 50 provides periodic clock pulses to be more specifically described hereinafter, and is connected to the input end of the clock winding 18 of the first stage of the circuit. A plurality of timing outputs of the source 50 provides sequential operating pulses occurring simultaneously with the clock pulses from the "clock" output, the timing outputs being designated outputs $T_1$ through $T_m$. The outputs $T_1$ through $T_m$ are connected to the other inputs of the gates of each of the stages of the circuit of FIG. 1. Thus, the outputs $T_1$ through $T_m$ are connected to the other inputs of the gates 40 through 43, respectively, of the first stage and also to the gates 45 through 48, respectively, of the last stage.

An interrogate and reset pulse source 51 having an "Int." and a "Reset" output is provided to supply a pair of sequential pulses during an interrogate and reset phase of operation, respectively. The latter outputs are connected to the interrogate and reset windings 20 and 24, respectively, of the first stage. The source 51 may also comprise any suitable source well known in the art capable of providing the pulses required. The connections between the sources 50 and 51 and the stages of the recognition circuit are not explicitly shown in the drawing. However, these connections may be readily ascertained and understood by reference to the labelled outputs and inputs depicted in FIG. 1. The timing and character of the various pulses referred to in the foregoing will be further described in connection with the discussion of illustrative operations of this invention which now follows.

As stated previously herein, the first stage of the circuit of FIG. 1 has its input variable windings arranged such that the binary code 1, 0, 1, . . . 1 will be recognized by that stage. The last stage has its input variable windings arranged such that the binary code 0, 1, 0, . . . 1 will be recognized. As the result of a previous reset operation, each of the elements $10_1$ through $10_n$ will be in a remanent magnetic flux condition as represented in the element 10′ of FIG. 2A. Each of the legs 11 and 13 will be remanently magnetized, the flux closing through the siderails and in the upward direction in the input legs 11 and in the downward direction in the output legs 13, as viewed in the drawing. The bypass legs 12 will at this time be substantially unmagnetized. These flux conditions and directions are symbolized in FIG. 2A by the dashed lines 56 and arrows in the legs 11′, 12′, and 13′ of the element 10′ which is understood to be a homologue of the elements 10 in FIG. 1. Each of the dashed lines 56 in the legs of the element 10′ may be understood as representing one-half of the total remanent flux capacity of the flux-limited legs.

With the elements 10 in the reset magnetic condition as described in the foregoing, periodic clock pulses applied from the "clock" output of the pulse source 50 to the serially connected clock windings 18 . . . 19 of the elements $10_1$ through $10_n$ may now be effective to cause a flux switching in the input legs 11 of the latter elements. The clock pulses 55 are shown in FIG. 3 as being positive and periodically recurring at the times $t_1$ through $t_m$ during the input phase of operation. The sense of each of the clock windings 18 . . . 19 of the elements 10 and the polarity and magnitude of the pulses 55 is such that, in the absence of other applied magnetomotive forces, the remanent flux in each of the coupled legs 11 will be switched. The switching flux so induced will be closed through the shortest available flux path or paths presented in the elements 10. In view of the reset remanent flux distribution already in the latter elements, the bypass legs 12 will provide closure for only part of the switching flux induced in the input legs 11. Accordingly, the remainder of the switching flux finds closure through the output legs 13. A result of the clock pulses 55 applied alone is thus to drive the bypass legs 12 to full remanent saturation and the output legs 13 to a substantially unmagnetized condition. The flux distribution resulting from the foregoing clock pulses 55 applied alone is symbolized in FIG. 2B by the dashed lines 56′. The flux changes so caused induce, during an input phase, signals in the output windings 30 . . . 31. The result of the clock pulses 55 applied alone during an input phase is thus the same for each of the stages. The output signals generated at this time, although available for utilization as may be dictated by the system needs, are ignored in the present embodiment. It is clear from the foregoing description of the effect of the clock pulses applied alone that once a flux switching has been caused by a clock pulse 55, no further flux switching can be caused in an input leg 11 by a subsequent clock pulse 55 applied alone. If the subsequent operating pulses comprise only clock pulses applied alone, the effect of each on the input leg 11 will simply be to drive it further into saturation from which point it returns to remanence at the termination of the clock pulse.

The clock pulses 55 may or may not be applied alone depending upon the concurrence of an input variable of the signal group appearing on the input network. This will be better understood from a comparison of the operation of each of the stages shown in FIG. 1 during the reception of the coded signal group which is recognizable by the first stage. In accordance with this signal group, positive serial input signals 57 depicted in FIG. 3 representative of binary "1's" appear on the conductor 37 from the pulse source 35 at the times $t_1$, $t_3$ and $t_m$ in concurrence with periodic clock pulses 55 also appearing at those times. The binary "0" occurring at the time $t_2$ in the signal group on the conductor 36 from the source 35 appears on the output conductor 39 of the inverter 38 as a positive pulse 58. At the time $t_1$ a code signal 57 representative of a binary "1" is thus applied to one of the inputs of each of the gates 40, 42, and 43 of the first stage and, via the conductor 44, also to one of the inputs of each of the gates 46 and 48 of the last stage. In order to insure the proper isolation of input signals to the stages of the circuit, the gates to which the latter signals are applied are enabled by sequential timing pulses 59 provided by the source 50 which also provides the clock pulses 55. The first of the timing pulses 59 appears at the time $t_1$ simultaneously with a clock pulse 55. The first of the timing pulses 59 appears on the output $T_1$ which is connected to an input of the gate 40 of the first stage and an input of the gate 45 of the last stage. Since no code signal is being applied to the variable input of the latter AND gate at this time, no energizing pulse in turn is applied to the input variable winding $17_1$ of the last stage. The clock pulse 55 being applied to the winding 19 during the time $t_1$ accordingly causes a flux switching in the input leg 11 of the element $10_n$ as represented by the dashed lines 56′ in FIG. 2B. The reversion to an unmagnetized condition of the output leg 13 of the latter element causes an output signal in the output winding 31 which will be available on the output terminal 33. However, this output signal generated during the input phase will be ignored in the specific embodiment being described.

The clock pulse 55 applied during the time $t_1$, however, will be prevented from causing a flux switching in the input leg 11 of the element $10_1$. During the time $t_1$ both a coded input signal 57 and an enabling timing signal 59 are applied to the gate 40. As a result, a current pulse of a magnitude sufficiently greater than the clock pulse 55 is applied to the input variable winding $16_1$ coupled to the input leg 11 of the element $10_1$ to counteract the effect of the clock pulse. Flux switching is accordingly prevented in the latter input leg. As a result of the appearance of the binary "1" during the input phase time $t_1$, the first element $10_1$ has thus recognized that, so far, the input has corresponded to the code group which it is wound to recognize. The fact that the incoming code group is foreign to the code for which the element $10_n$ is wound is also recognized by the latter element when the flux in the input leg 11 is switched by the clock pulse. Since the first signal of the code group was foreign, the entire group is so recognized, and although a variable input pulse and clock pulse may cause a flux switching in the input leg 11 and bypass leg 12 of the element $10_n$ during subsequent input times in the manner to be described, no subsequent code signals during the particular input phase being described can effect any further flux changes in the output leg 13 of the element $10_n$.

The next character of the code group to be recognized by the first stage is a binary "0" and an input signal representative of this value is supplied via the inverter 38 and conductor 39 to the input network. In accordance with the windings of the elements $10_1$ and $10_n$ this signal appearing at the time $t_2$ is applied to the gate 41 of the first stage and to the gates 45 and 47 of the second stage. At the time $t_2$ only the gate 41 of these gates are enabled by a timing pulse 59 and acordingly the signal 58 representative of a binary "0" is applied to the winding $16_2$ of the element $10_1$ alone. The concurring clock pulse 55 at this time is again unable to cause a flux switching in the input leg 11 of the element $10_1$, and the flux in the latter leg remains in the reset condition as represented by the dashed lines 56 in FIG. 2A. No change results from the application of the clock pulse 55 to the winding 19 in the input leg 11 of the element $10_n$ since the flux in the latter leg has already been switched therein by the immediately previous clock pulse. During the times $t_3$ and $t_m$ coded signals 57 representative of binary "1's" are applied to the gates 42 and 43, respectively, of the first stage. During these times enabling timing pulses 59 are also applied to the latter gates from the source 50. As a result, the signal pulses 57, occurring at the same times as the clock pulses 55 applied to the clock winding 18 of the element $10_1$, prevent any flux switching in the latter leg.

It may be noted that, during the time $t_m$, the gate 48 of the last stage is also enabled and that a binary "1" signal 57 is thus also applied to the input variable winding $17_m$ of the last stage. In this case, since the input leg 11 of the latter stage has already been switched, the algebraic sum of the magnetomotive forces generated by the clock and variable pulses 55 and 57, respectively, may be sufficient to switch the flux in the leg 11 of the last stage back to its reset condition. In the normal case the relative magnitudes and time durations of the input variable and clock pulses will be chosen such as to insure that the input variaible pulse will be sufficiently large to positively block the switching action of the clock pulse. A subsequent input variable pulse and clock pulse together will thus generally cause a flux switching in the input leg 11 back to its reset flux condition. However, any flux switching occurring in an input leg 11 will be closed at this time through the bypass leg 12 alone without magnetically affecting the output leg 13. The flux distribution resulting from this localized switching is symbolized in FIG. 2C by the dashed lines 56″. As is clear from a comparison of FIGS. 2B and 2C, the substantially unmagnetized condition of the output leg 13 remains undisturbed.

At the termination of the input phase of operation of the particular operation being described, the element $10_1$ remains in the reset magnetic condition as represented in FIG. 2A by the dashed lines 56; and the element $10_n$ is in a magnetic condition as represented by the dashed lines 56'' in FIG. 2C. As demonstrated by the operation of the first stage of the circuit of FIG. 1, at each of the times $t_1$ through $t_m$ of the input phase of operation, the reception of a correct character of the code to be recognized maintains the magnetic condition of an element 10 in its reset state. On the other hand, as demonstrated by the operation of the last stage of the circuit of FIG. 1, the reception of the first character failing to correspond to the code to be recognized during the input phase, switches the magnetic condition of an element 10 from its reset state with no restoration possible during a particular input phase. The recognition circuit of FIG. 1 is now prepared for an interrogation phase.

An interrogation signal 60 is provided by the source 51 and is timed to occur at any time during the interval between the last of the timing pulses 59 which occurs at the time $t_m$ during the input phase just described, and a first timing pulse 59 of the subsequent input phase during which the sequence of timing pulses 59 is repeated. The memory properties of the elements 10 permit interrogation of the latter elements at any time as may be dictated by the requirements of the system of which the present invention may advantageously comprise a part. The timing and clock pulses are thus interrupted during the interval being described in the particular embodiment of this invention of FIG. 1. A positive interrogation pulse 60 thus occurs at a time $t_{int.}$ and is applied from the source 51 to the "Int." input end of the interrogate winding 20 of the first stage and thence via the interrogate windings of interposed stages and the conductor 23 to the interrogate winding 21 of the last stage. The sense of the latter interrogate windings with respect to the input legs 11 of the elements $10_1$ and $10_n$ is such that switching magnetomotive forces in a downward direction as viewed in the drawing are developed therein by the interrogate pulse 60. Since in the first stage the input leg 11 has been maintained in its reset magnetic condition, that is, upward as viewed in the drawing, the interrogate pulse 60 at this time causes a flux switching in the input leg 11 of that stage, which flux switching, as previously discussed, is closed through the bypass leg 12 and the output leg 13. The flux in the output leg 13 of the first stage, as a result, reverts to a substantially unmagnetized condition; and the flux change thus caused induces an output signal in the output winding 30 coupled to the output leg 13 of the element $10_1$. The output signal thus induced is made available on the output terminal 32 and at this time is utilized as indicative of the fact that all of the characters of the code 1, 0, 1, . . . 1 for which the element $10_1$ is wound have been received thereby.

The interrogate pulse 60 also generates a magnetomotive force in the input leg 11 of the element $10_n$ in a direction which may cause a flux switching in that leg. That is, as a result of previously applied clock pulses alone or of a previous input variable pulse applied together with a clock pulse following a clock pulse alone, the flux distribution in the element $10_n$ may be either as symbolized in FIG. 2B or as in FIG. 2C. However, since the flux switching, if any, is confined to the flux loop including only the input leg 11 and the bypass leg 12, the flux in the output leg 13 of the element $10_n$ will remain undisturbed by the interrogate pulse 60. Accordingly, no output signal is generated in the output winding 31 of the output leg 13 of the element $10_n$. The absence of an output signal on the output terminal 33 of the last stage is thus indicative that the coded signal group received during the previous input phase was not one recognizable by the last stage.

Before a coded group of input signals may again be introduced into the circuit of FIG. 1, the magnetic condition of each of the elements 10 is restored to the reset state. This is accomplished during a reset phase of operation by the application from the source 51 of a reset pulse 61 to the "Reset" end of the reset winding 24 of the element $10_1$. The reset pulse 61 is timed to occur any time during the interval between the interrogate phase of operation and the time $t_1$ of a subsequent input phase. This time is represented in FIG. 3 as the time $t_{reset}$. The reset windings of each of the elements 10 are wound in a sense such that the magnetomotive forces generated by the reset pulse 61 are in a direction to restore the elements 10 to the reset magnetic condition as represented in FIG. 2A by the dashed lines 56.

In subsequent input phases a coded signal group may be received which is recognizable by the last stage of the circuit depicted in FIG. 1. As previously mentioned, the illustrative code group selected for this purpose was the binary code 0, 1, 0, . . . 1. The binary "1's" and "0's" of this group are shown in FIG. 3 as the signals 62 and 63, respectively, and the times at which they occur may be determined by reference to the latter figure. The operation of the circuit of FIG. 1 during the reception of the latter coded signal group is substantially similar to that described in connection with the previous exemplary signal group described in the foregoing. Obviously in the former case, instead of an output signal appearing on the output terminal 32 of the first stage, an output signal will be induced in the output winding 31 of the last stage to be available on the terminal 33 of that stage to indicate the recognition of the code.

The timing control of the input, interrogation, and reset phases of operation may be provided by associated circuitry in the system in which the present invention may find application. Thus, the timing control of the sources 35, 50, and 51 is readily envisioned by one skilled in the art and, since such control means are not required for a complete understanding of this invention, they need not be shown in the drawing nor described herein. Although the various current pulses employed during the operation of this invention have been described as being positive, it will be appreciated that the polarity of the pulses may be determined by the particular sources available with an adjustment in the sense of the various windings being made as determined by the polarity of the current pulses. The number of turns of the various operating windings have been shown as single turn. It will further be appreciated that these are representative only and that the actual number of turns employed in the practice of this invention may be readily ascertained by one skilled in the art.

In describing the operation of this invention various flux distribution patterns have been assumed as resulting from the pulses applied to the several windings coupled to the input legs 11 of the elements $10_1$ through $10_n$. These patterns are not intended to show the actual flux switching phenomena occurring within the magnetic structures. The patterns however have been employed merely as a convenient device to explain the result of the applied magnetomotive forces in the flux limited magnetic elements such as those described in connection with the present invention and will be readily comprehended by one skilled in the art.

What has been described is considered to be only one illustrative embodiment of this invention. Accordingly, various and numerous other arrangements may be devised by one skilled in the art without departing from the spirit and scope of this invention.

What is claimed is:

1. An electrical circuit comprising a magnetic element having substantially rectangular hysteresis characteristics, said element being apertured to have an input, an output, and a bypass leg, thereby presenting a first and a second closed flux path including said input and output legs and said input and bypass legs, respectively, means for inducing a reset remanent flux condition in said input and output legs of said first flux path, a clock winding and a plurality of input windings coupled to said input leg of said first and second flux paths, means for applying periodic clock pulses to said clock winding of a polarity and magnitude such as to induce a switching flux in said input and bypass legs of said second flux path, means for individually applying input pulses to said input winding simultaneously with said periodic clock pulses, said input pulses being of a polarity and magnitude to maintain said input and output legs of said first flux path in said reset flux condition, and an output winding coupled only to said output leg of said first flux path energized responsive to flux changes in said first flux path for generating output signals.

2. An electrical circuit as claimed in claim 1, also comprising an interrogate winding coupled to said input leg of said first and second flux paths and means for applying interrogate pulses to said interrogate winding subsequent to said clock and input pulses, said input and bypass legs of said interrogate pulses being of a polarity and magnitude also to induce a switching flux in said second flux path.

3. An electrical code circuit comprising a magnetic element having a plurality of apertures therein to define an input leg, a bypass leg, and an output leg, each of said legs having substantially rectangular hysteresis characteristics, a plurality of input windings and a clock winding on said input leg, means for inducing a reset flux in said input leg and for closing said reset flux through said output leg, means including a clock pulse source for applying periodic clock pulses to said clock winding of a polarity to induce a switching flux in said input leg, said input and bypass legs being so arranged that said switching flux is closed through said bypass leg and said output leg thereby causing a flux change in said output leg from magnetic remanence to a substantially unmagnetized condition, means including a source of sequential information pulses for applying information pulses to said input windings concurrently with said periodic clock pulses, said information pulses being of a polarity and magnitude to maintain said reset flux in said input and output legs, and an output winding on said output leg energized responsive to flux changes in said output leg for generating output signals.

4. An electrical code circuit as claimed in claim 3 also comprising an interrogate winding on said input leg and means including an interrogate pulse source for applying an interrogate pulse to said interrogate winding subsequent to said information and clock pulses, said interrogate pulse being of a polarity and magnitude also to induce a switching flux in said input leg when each of said information pulses has maintained said reset flux in said input leg.

5. An electrical switching circuit comprising a multi-apertured magnetic element having an input leg, an output leg, and a bypass leg, thereby presenting a first closed flux loop including said input and output legs and a second flux loop shorter than said first flux loop and including said input leg and said bypass leg, a reset winding linked to said first and second flux loops, means for applying a reset pulse to said reset winding to induce a remanent flux only in input and output legs of said first flux loop, at least one input winding and a clock winding coupled to said input leg, means for applying a clock pulse to said clock winding of a polarity and magnitude to transfer said remanent flux from said output leg of said first flux loop to said bypass leg of said second flux loop, means for applying an input pulse to said input winding of a polarity and magnitude to counteract said clock pulse, and an output winding coupled to said output leg energized when said remanent flux is transferred from said output leg of said first flux loop to said second bypass leg of said flux loop to generate an output signal.

6. An electrical switching circuit as claimed in claim 5 also comprising an interrogate winding coupled to said input leg and, means for applying an interrogate pulse to said interrogate winding subsequent to said clock and input pulses, said interrogate pulse being of a polarity and magnitude also to transfer said remanent flux from said output leg of said first flux loop to said bypass leg of said second flux loop when both a clock pulse and an input pulse have been applied to said clock and input windings.

7. An electrical switching circuit as claimed in claim 6 in which the minimum cross-sectional areas of said input, output, and bypass legs are substantially equal.

8. An electrical circuit comprising a magnetic element having substantially rectangular hysteresis characteristics, said element having a plurality of legs for completing a plurality of closed flux loops therein, at least a first and a second flux loop sharing an input leg of said element and said first flux loop including an output leg of said element, a plurality of input windings and a clock winding coupled to said input leg, an output winding coupled to said output leg, means for inducing a remanent flux in one direction in said first flux loop to couple said input and clock windings to said output winding, means for generating an output signal in said output winding comprising means for periodically applying clock pulses to said clock winding, each being of a polarity and magnitude such as to transfer said remanent flux in the opposite direction to said second flux loop; and means for preventing an output signal in said output winding comprising means for sequentially applying coded input signals to said input windings, each being of a polarity and magnitude to counteract said clock pulses and thereby prevent said transfer of said flux to said second flux loop.

9. An electrical circuit as claimed in claim 8 also comprising second means for subsequently generating an output signal in said output winding when an output signal has been prevented therein by said coded input signals comprising an interrogate winding also coupled to said input leg and coupled to said output winding by said remanent flux in said first flux loop and means for periodically applying an interrogate pulse to said interrogate winding, said interrogate pulse being of a polarity and magnitude such as to also transfer said remanent flux in the opposite direction to said second flux loop.

10. An electrical circuit as claimed in claim 9, also comprising reset means for retransferring said remanent flux in said one direction to said first flux loop comprising reset windings coupled to portions of said element shared by said first and second flux loops and to a portion of said element including said first flux loop alone and means for applying a reset current pulse to said reset windings.

11. An electrical circuit comprising a magnetic element having substantially rectangular hysteresis characteristics, said element having a plurality of flux legs therein having substantitally the same minimum cross-sectional areas, said element presenting a first flux loop including an input flux leg and an output flux leg, said element also presenting a second flux loop including said input flux leg and a bypass flux leg, said input flux leg, output flux leg, and said bypass flux leg being arranged such that said second flux loop has a substantially lower reluctance than said first flux loop, means for establishing a reset remanent flux in said first flux loop, a plurality of input windings coupled to said input leg, means for sequentially applying input pulses to said input windings representative of a particular code group, said input pulses being of a polarity and magnitude to maintain said remanent flux in said first flux loop, a clock winding coupled to said input leg, means for applying periodic clock pulses to said clock winding simultaneusly with said sequential input pulses, said clock pulses being of a polarity and magnitude such as to induce a switching flux in said input leg upon the absence of any one of said input pulses, said switching flux transferring said remanent flux from said first flux loop to said second flux loop to cause a flux change in said output leg from magnetic remanence to substantial nonmagnetization, and an output winding coupled to said output leg energized responsive to said flux change for generating an output signal indicative of said absence of said any one of said input pulses.

12. An electrical circuit acording to claim 11 also comprising an interrogate winding coupled to said input leg and means for applyng an interrogate pulse to said interrogate winding subsequent to said clock and input pulses, said interrogate pulse also being of a polarity and magnitude such as to induce a switching flux in said input leg when all of the input pulses representative of said particular code group have been applied to said input windings, said last-mentioned switching flux also causing a flux change in said output leg.

13. A code recognition circuit comprising a plurality of magnetic elements each having a plurality of apertures therein to define an input leg, a bypass leg, and an output leg, each of said legs having substantially rectangular hysteresis characteristics, each of said elements having a plurality of input windings and a clock winding on the input leg thereof, means for inducing a reset remanent flux in each of said elements, said reset flux being closed through said input leg and said output leg of each of said elements, means including a clock pulse source for simultaneously applying periodic clock pulses to said clock windings of each of said elements, said clock pulses being of a polarity and magnitude to induce a switching flux in said input legs of said elements, said input legs and said bypass legs being so arranged that said switching flux is closed through said bypass leg and output leg of each of said elements thereby causing flux changes in said output legs from magnetic remanence to a substantially unmagnetized condition, an input network including a pulse source for providing a plurality of groups of coded input pulses representative of particular groups of coded information, said network being respectively connected to the input windings of said plurality of elements in accordance with said partcular groups of information, said input pulses beng of a polarity and magnitude to prevent said clock pulses from inducing said switching flux in said input legs, and an output winding coupled to the output leg of each of said elements energized responsive to said flux changes in said output legs.

14. A code recognition circuit as claimed in claim 13 also comprising an interrogate winding coupled to the input leg of each of said elements and means for simultaneously applying an interrogate pulse to the interrogate winding of each of said elements subsequent to said input and clock pulses, said interrogate pulse also being of a polarity and magnitude such as to induce a switching flux in the input leg of a particular element when all of the input pulses of the coded input pulses of a particular group of coded information have ben applied to the input windings of said particular element, said last-mentioned switching flux also causing a flux change in the output leg of said particular element.

15. A code recognition circuit comprising a multi-apertured magnetic structure having substantially rectangular hysteresis characteristics, said structure having at least an input, an output, and a bypass leg therein, a plurality of code input windings, a clock winding, and an interrogate winding coupled to said input leg, a reset wnding coupled to said structure, means for applying a reset pulse to said reset winding for inducing a normal magnetic flux in a flux loop in said structure including sad input leg and said output leg, means for applying periodic clock pulses to said clock winding of a magnitude to induce a switching flux in a flux loop in said structure including said input leg and said bypass leg, means for applying code input pulses to said input winding concurrently with said clock pulses, said input pulses being of a polarity and of a magnitude such as to prevent said inducing of said switching flux, means for applying an interrogate pulse to said interrogate winding for switching the flux in said input leg, and an output winding on said output leg energized responsive to flux switching in said output leg for generating an output signal indicative of the concurrence of said clock pulses and said code input pulses.

References Cited in the file of this patent

UNITED STATES PATENTS

| | | |
|---|---|---|
| 2,519,426 | Grant | Aug. 22, 1950 |
| 2,818,554 | Chen et al. | Dec. 31, 1957 |
| 2,869,112 | Hunter | Jan. 13, 1959 |
| 2,923,923 | Raker | Feb. 2, 1960 |
| 2,926,342 | Rodgers | Feb. 23, 1960 |
| 2,963,591 | Crowley et al. | Dec. 6, 1960 |
| 2,978,176 | Lockhart | Apr. 4, 1961 |

UNITED STATES PATENT OFFICE
CERTIFICATE OF CORRECTION

Patent No. 3,123,718 March 3, 1964

John Knox-Seith

It is hereby certified that error appears in the above numbered patent requiring correction and that the said Letters Patent should read as corrected below.

Column 11, lines 19 and 20, strike out "said input and bypass legs of" and insert the same after "in" in line 21, same column 11; same column 11, line 71, strike out "second" and insert the same after "said", third occurrence, in same line 71, same column 11.

Signed and sealed this 7th day of July 1964.

(SEAL)
Attest:

ERNEST W. SWIDER
Attesting Officer

EDWARD J. BRENNER
Commissioner of Patents